US012181107B2

(12) United States Patent
Guerif et al.

(10) Patent No.: US 12,181,107 B2
(45) Date of Patent: Dec. 31, 2024

(54) PRESSURE OR FLOW REGULATION METHOD FOR GASEOUS HYDROGEN DISPENSING SYSTEM

(71) Applicant: L'Air Liquide, Societe Anonyme pour l'Etude et l'Exploitation des Procedes Georges Claude, Paris (FR)

(72) Inventors: Pierre-Philippe Guerif, Houston, TX (US); Paul Kong, Sugar Land, TX (US); Wendy May Yee Yip, Sugar Land, TX (US); Aaron Harris, San Mateo, CA (US); Jorge Lopez, Houston, TX (US)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 112 days.

(21) Appl. No.: 17/527,522

(22) Filed: Nov. 16, 2021

(65) Prior Publication Data
US 2023/0151929 A1 May 18, 2023

(51) Int. Cl.
*F17C 5/00* (2006.01)
*F17C 7/00* (2006.01)
*G05D 16/20* (2006.01)

(52) U.S. Cl.
CPC .............. *F17C 5/007* (2013.01); *F17C 7/00* (2013.01); *G05D 16/204* (2013.01); *F17C 2250/043* (2013.01); *F17C 2250/0626* (2013.01)

(58) Field of Classification Search
CPC .................................. F17C 5/007; F17C 7/00
See application file for complete search history.

(56) References Cited

U.S. PATENT DOCUMENTS

| 5,884,675 A | * | 3/1999 | Krasnov .............. F17C 5/06 141/3 |
| 6,722,399 B1 | | 4/2004 | Cano |
| 7,316,242 B2 | * | 1/2008 | Porter .............. F17C 13/084 137/255 |
| 2017/0059089 A1 | | 3/2017 | Uchida et al. |

(Continued)

FOREIGN PATENT DOCUMENTS

| EP | 1 146 277 | 10/2001 |
| EP | 1 760 388 | 3/2007 |

(Continued)

OTHER PUBLICATIONS

International Search Report and Written Opinion for PCT/US2022/049837, mailed Mar. 22, 2023.

*Primary Examiner* — Kenneth Rinehart
*Assistant Examiner* — Nicole Gardner
(74) *Attorney, Agent, or Firm* — Justin K. Murray

(57) ABSTRACT

The present invention relates to a method for improving stability of a hydrogen gaseous dispensing system. An example of such system is hydrogen powered vehicle fuel filling station. Vehicle is filled by multiple high pressure gaseous hydrogen tubes, usually one tube at a time. For safety and reliability reasons a control requirement for such system is to be able to deliver the hydrogen at constant rate to the fuel tank so that its rate of pressure increase stays constant during entire filling process. A dual pressure regulator arrangement is proposed to better maintain flow continuity and/or pressure during tube switching.

8 Claims, 2 Drawing Sheets

(56) References Cited

U.S. PATENT DOCUMENTS

2018/0023764 A1\* 1/2018 Okuno ..................... F17C 5/06
 141/197
2021/0231264 A1 7/2021 Takahashi et al.

FOREIGN PATENT DOCUMENTS

| JP | 2020 101 255 | 7/2020 |
| WO | WO 2009/079276 | 6/2009 |

\* cited by examiner

PRESSURE OR FLOW REGULATION METHOD FOR GASEOUS HYDROGEN DISPENSING SYSTEM

BACKGROUND

Technical Field

This disclosure relates to pressure stability management of a pressurized gas flow, in particular a Hydrogen gas for refueling a Hydrogen fuel cell electric vehicle (FCEV).

Background Art

High pressure gaseous hydrogen stored in multiple tubes (tube bundle) is dispensed to the vehicle fuel tank (receiving tank) by pressure differential between the tube and fuel tank. In order to maximize the utilization of the tube bundle storage capacity, the strategy is to minimize the average pressure differential between tube and fuel tank during the filling process. Fuel tank is filled by one tube at a time in a cascading manner starting with the tube having the lowest pressure differential. When the pressure in the tube reaches preset limit in relation to the fuel tank pressure, it is switched to the tube having the next lowest pressure differential between the tube and receiving tank. The switching is done by first opening the isolation valve of the incoming tube and then closing the isolation valve of the outgoing tube. This sequence is repeated until the fuel tank reaches the desired pressure.

A common accepted way of regulating flow, and therefore, the rate of pressure rise is by a pressure control valve (PCV). However, a stable flow to receiving tank cannot be ensured in this single PCV arrangement. The receiving tank will most likely experience a surge in flow during tubing switch due to a sudden pressure increase (spike) upstream of PCV if the valve is maintained in auto mode. On the other hand, the flow to the receiving tank will be disrupted if PCV is switched to inactive mode (i.e., close position).

SUMMARY OF INVENTION

The invention may be understood in relation to the following embodiments:

There is disclosed a system for adding a pressurized gas to a receptacle container that is fluidically connected thereto, the system comprising: a) a plurality of banks of pressurized gas containers, the banks each having a plurality of pressurized gas containers, wherein each pressurized container of a bank is fluidically connected to a common bank manifold and a common bank pressure control valve (PCV). b) The common bank PCV is configured to be downstream from that bank, and all pressurized gas containers thereof, the common bank PCV adapted to control a of flow of the pressurized gas from that bank to the receptacle container. c) The bank PCVs are configured and adapted to operate in sequence in response to a computer control. d) The computer control is configured and specifically programed to control the opening and closing of the bank PCVs in response to a pressure value representing a pressure of the pressurized gas in a first pressurized container of a first bank (Bank A). The computer control specifically programmed to execute the steps of: A) detecting a first pressure in a first pressurized gas container of the first bank (Bank A), B) comparing the first pressure of the first pressurized gas container of the first bank (Bank A) to a receptacle container pressure, C) when the comparison of (B) reaches a pre-determined minimum pressure differential, comparing a pressure value for each pressurized gas containers of a second bank (Bank B) to identify a second pressurized gas container having the smallest pressure differential with the receptacle pressure container, D) opening a second isolation valve of the second pressurized gas container of the second bank to create a fluid communication between the second pressurized gas container and the second bank PCV, E) proportionally opening the second bank PCV to maintain a minimum pressure of the gas flow to the receptacle container based on a pressure decay of a pressurized gas flow through the first bank PCV, and F) when the first pressure of the first pressurized gas container falls to a second preset pressure differential with the pressure of the receptacle container, closing the first PCV.

There is also disclosed a method of adding a pressurized gas to a container that is fluidically connected to above-described system. The method includes the following steps. a) A first pressure in a first pressurized gas container of the first bank (Bank A), is detected. b) The first pressure of the first pressurized gas container of the first bank (Bank A) is compared to a receptacle container pressure. c) When the comparison of (B) reaches a pre-determined minimum pressure differential, a pressure value for each pressurized gas containers of a second bank (Bank B) is compared to identify a second pressurized gas container having the smallest pressure differential with the receptacle pressure container. d) A second isolation valve of the second pressurized gas container of the second bank is opened to create a fluid communication between the second pressurized gas container and the second bank PCV. e) The second bank PCV is proportionally opened to maintain a minimum pressure of the gas flow to the receptacle container based on a pressure decay of a pressurized gas flow through the first bank PCV. f) When the first pressure of the first pressurized gas container falls to a second preset pressure differential with the pressure of the receptacle container, the first PCV is closed.

The above-described system and/or method may include one of the following aspects:
- a first isolation valve of the first pressurized gas container is closed concurrently with or subsequent to (F).
- the computer control is configured and specifically programed to additionally execute a set point swap process wherein a set point of the second PCV is set to a pre-determined value below the set point of the first PCV and then the pre-determined set point value is reduced to zero.
- the computer control is configured and specifically programed to repeat (A)-(F) for the second pressurized container and a third pressurized container in the first bank.
- g) a first isolation valve of the first pressurized gas container is closed concurrently with or subsequent to step f).
- in a set point swap process, a set point of the second PCV is set to a pre-determined value below the set point of the first PCV and then the pre-determined set point value is reduced to zero.
- steps a)-f) are repeated for the second pressurized container and a third pressurized container in the first bank.

DETAILED DESCRIPTION

The objective of the current invention is to eliminate the above drawback by dividing the multiple tubes (1-14) into two banks (Bank A, Bank B) with each bank having one common PCV (PCV-A, PCV-B) so that filling is done alternatively between the banks.

Figure 1:
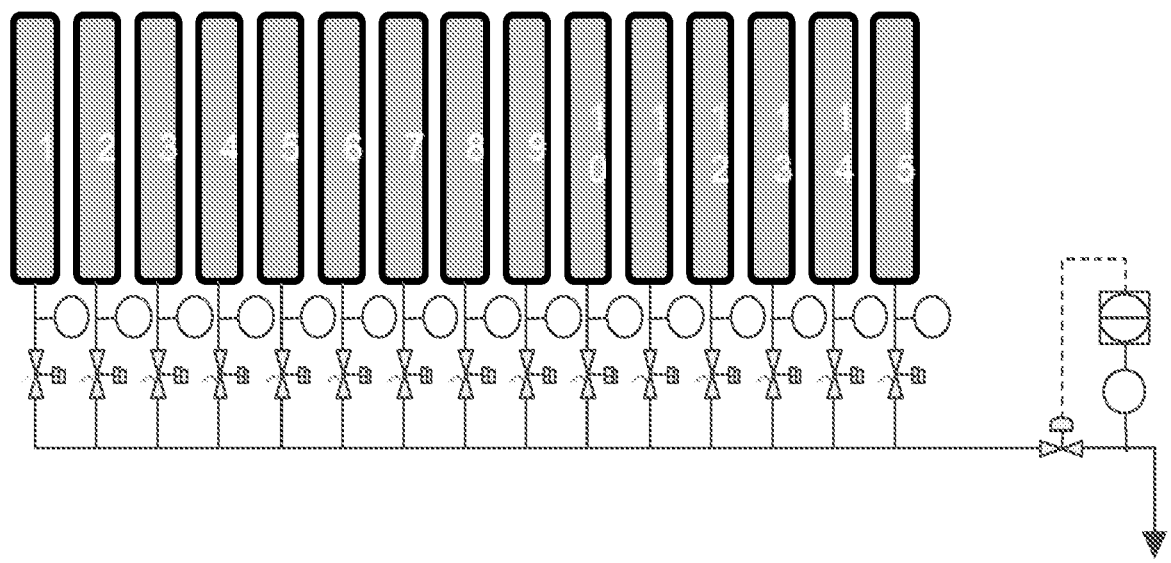
FIG. 1 shows a prior art system for producing a stream of pressurized gas.
Figure 2:
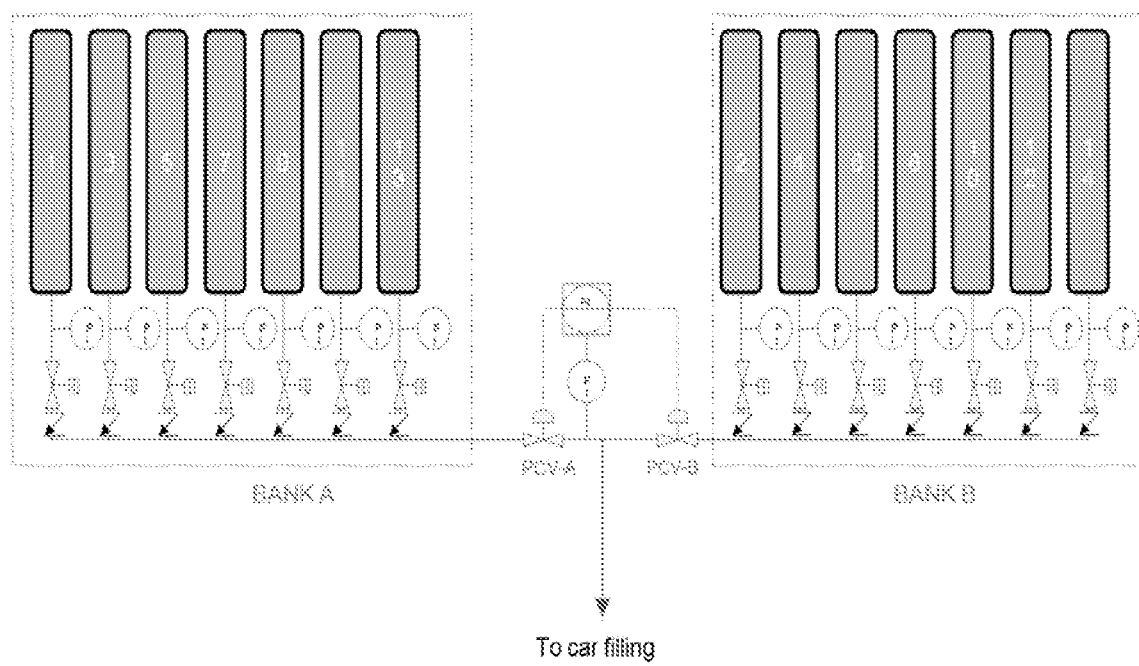
FIG. 2 shows an embodiment of the present invention having two independent banks of pressurized gas storage containers, with each bank having a pressure control valve connected to a common outlet conduit.
Figure 3:
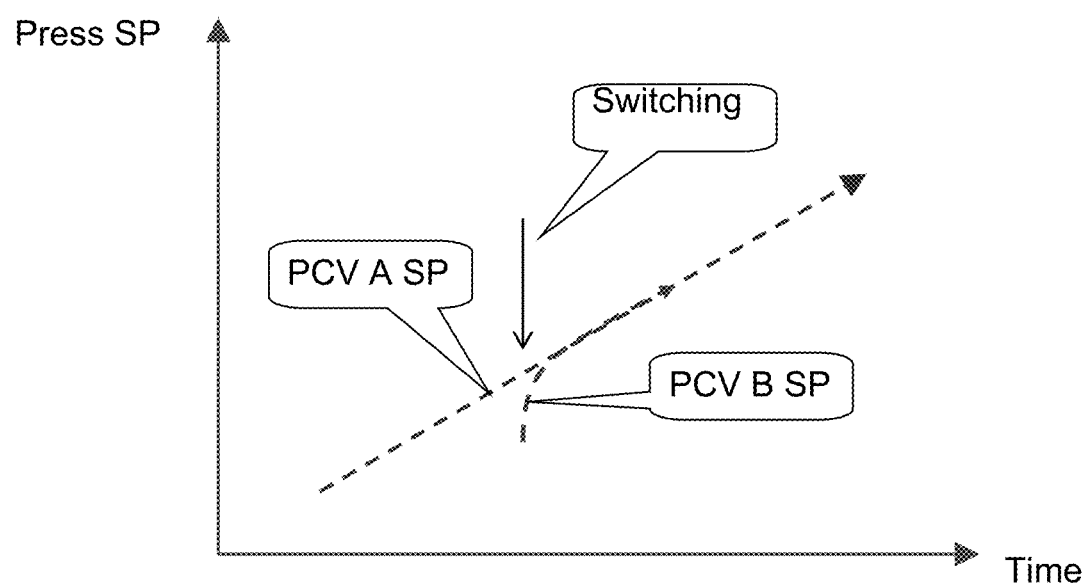
FIG. 3 shows a diagram of the pressure set point swapping process.

The tube switching sequence is managed by a computer (not shown) as follows:

Filling is started from a tube (Tube 1) in Bank A having the lowest pressure differential to the vehicle fuel tank and PCV-A is controlling the rate of pressure rise. When the pressure differential between Tube 1 in Bank A and the receiving tank decays to a preset limit, the sequence will select the next filling tube (Tube 2) from Bank B having the lowest pressure differential to the vehicle fuel tank and open the corresponding isolation valve to pressurize the piping and manifold header up to PCV-B. PCV-B is switched to active mode (auto mode) with a set tracking the current setpoint of PCV-A, after the isolation valve is open, and its upstream is pressurized. As the pressure differential between Bank A and the receiving tank continues to decay so that PCV-A will no longer maintain the full flow, PCV-B will start open to supply the supplemental flow and Bank B is gradually brought online (FIG. 3). When the pressure differential reaches to the preset limit, Bank A will be taken offline by ramp closure of PCV-A, and then its isolation valve. The cycle is repeated between banks A and B until the receiving tank reaches its desired pressure.

The transition can be further improved by adapting a setpoint swap strategy. PCV-B is switched to auto with an offset below the setpoint of PCV-A. Then, the offset is gradually reduced to zero.

INDUSTRIAL APPLICABILITY

The present invention is at least industrially applicable to refueling Hydrogen FCEVs.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising").

"Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A system for adding a pressurized gas to a receptacle container that is fluidically connected thereto, the system comprising:
   a) a plurality of banks of pressurized gas containers, the banks each having a plurality of pressurized gas containers, wherein each pressurized container of a bank is fluidically connected to a common bank manifold and a common bank pressure control valve (PCV);
   b) the common bank PCV being configured to be downstream from that bank, and all pressurized gas containers thereof, the common bank PCV adapted to control a flow of the pressurized gas from that bank to the receptacle container;
   c) the bank PCVs configured and adapted to operate in sequence in response to a computer control;
   d) the computer control configured and specifically programed to control the opening and closing of the bank PCVs in response to a pressure value representing a pressure of the pressurized gas in a first pressurized container of a first bank (Bank A), the computer control specifically programmed to execute the steps of:
      (A) detecting a first pressure in a first pressurized gas container of the first bank (Bank A),
      (B) comparing the first pressure of the first pressurized gas container of the first bank (Bank A) to a receptacle container pressure,
      (C) when the comparison of (B) reaches a pre-determined minimum pressure differential, comparing a pressure value for each pressurized gas containers of a second bank (Bank B) to identify a second pressurized gas container having the smallest pressure differential with the receptacle pressure container,
      (D) opening a second isolation valve of the second pressurized gas container of the second bank to create a fluid communication between the second pressurized gas container and the second bank PCV,
      (E) proportionally opening the second bank PCV to maintain a minimum pressure of the gas flow to the receptacle container based on a pressure decay of a pressurized gas flow through the first bank PCV, and
      (F) when the first pressure of the first pressurized gas container falls to a second preset pressure differential with the pressure of the receptacle container, closing the first PCV.

2. The system of claim 1, further comprising (G) closing a first isolation valve of the first pressurized gas container concurrently with or subsequent to (F).

3. The system of claim 1, wherein the computer control is configured and specifically programed to additionally execute a set point swap process wherein a set point of the second PCV is set to a pre-determined value below the set point of the first PCV and then the pre-determined set point value is reduced to zero.

4. The system of claim 1, wherein the computer control is configured and specifically programed to repeat (A)-(F) for the second pressurized container and a third pressurized container in the first bank.

5. A method of adding a pressurized gas to a container that is fluidically connected to a pressurized gas delivery system in accordance with claim 1, the method comprising:
   a) detecting a first pressure in a first pressurized gas container of the first bank (Bank A);
   b) comparing the first pressure of the first pressurized gas container of the first bank (Bank A) to a receptacle container pressure;
   c) when the comparison of (B) reaches a pre-determined minimum pressure differential, comparing a pressure value for each pressurized gas containers of a second bank (Bank B) to identify a second pressurized gas container having the smallest pressure differential with the receptacle pressure container;
   d) opening a second isolation valve of the second pressurized gas container of the second bank to create a fluid communication between the second pressurized gas container and the second bank PCV;
   e) proportionally opening the second bank PCV to maintain a minimum pressure of the gas flow to the receptacle container based on a pressure decay of a pressurized gas flow through the first bank PCV; and
   f) When the first pressure of the first pressurized gas container falls to a second preset pressure differential with the pressure of the receptacle container, closing the first PCV.

6. The method of claim 5, further comprising step g), closing a first isolation valve of the first pressurized gas container concurrently with or subsequent to step f).

7. The method of claim 5, further comprising a set point swap process wherein a set point of the second PCV is set to a pre-determined value below the set point of the first PCV and then the pre-determined set point value is reduced to zero.

8. The method of claim 5, further comprising repeating steps a)-f) for the second pressurized container and a third pressurized container in the first bank.

* * * * *